J. RIZZARDI.
METHOD OF MANUFACTURING METAL BASKETS.
APPLICATION FILED NOV. 10, 1913.
1,144,668.  Patented June 29, 1915.
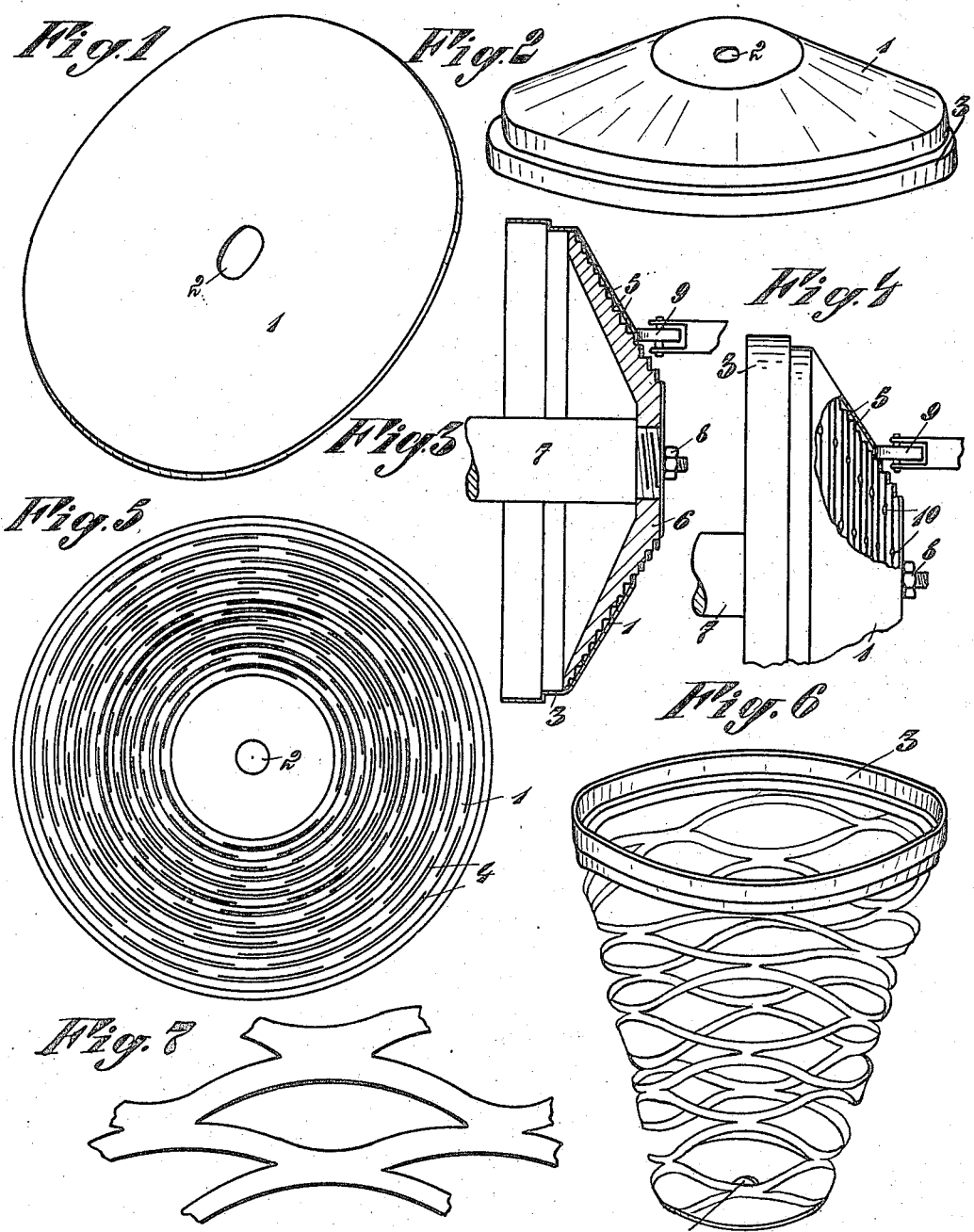

UNITED STATES PATENT OFFICE.

JOHANN RIZZARDI, OF CASSEL, GERMANY.

METHOD OF MANUFACTURING METAL BASKETS.

1,144,668.  Specification of Letters Patent.  Patented June 29, 1915.

Application filed November 10, 1913. Serial No. 800,226.

*To all whom it may concern:*

Be it known that I, JOHANN RIZZARDI, a subject of the German Emperor, and resident of Cassel, in the German Empire, have invented an Improved Method of Manufacturing Metal Baskets, of which the following is a full, clear, and exact description.

My invention comprises an apparatus, which shall be used for producing seamless trellis baskets from sheet metal, but by this apparatus only a half-finished product can be produced, which must be still drawn. Further, it is necessary to cut and press the original sheet metal plate, before bringing it into the apparatus. Therefore also the whole manufacture as a whole is fully described hereinafter.

In order to make my invention and its use more clear, I refer to the accompanying drawing, in which the several stages of operation during the production of a basket are shown and in which similar letters denote similar parts throughout the several views, of which:

Figure 1 is a perspective view of a circular sheet metal plate, as employed in my invention; Fig. 2 shows said plate pressed and provided with a folded rim; Fig. 3 is an axial section through a cutting device employed in the further treatment of the pressed sheet metal plate; Fig. 4 shows the same cutting device partly in section and partly broken away; Fig. 5 is a plan view of the plate in question after having been slotted; Fig. 6 is a perspective representation of the finished basket; and Fig. 7 shows a portion of the basket on a larger scale.

The basket is produced from a seamless circular sheet metal plate 1 having a central hole 2. This plate is pressed in known manner between a patrix and a matrix, the shape of which is such that the plate 1 receives the configuration shown in Fig. 2, resembling an inverted dish and having a flanged rim 3, but it is also sufficient when the sheet metal plate only receives the flanged rim 3 and the other part remains plane. The slotting operation is effected by means of the novel apparatus, *i. e.* the specially designed contrivance shown in Figs. 3 and 4, in which the plate holder, forms a rotary support 6, the outer surface of which is concentrically stepped. The edges of the steps form cutting edges and they coöperate with a cutting roll 9 which is pressed against the conical plate 1 and thus against one or the other of the various steps 5 in the axial direction of the cone 6, cutting in this manner the metal just at the step edges and expanding the respective metal parts slightly at the respective part of that step. To form the integral connections between the metal strips forming the trellis work, the cutting edges in question are interrupted in regular intervals, as shown at 10 in Fig. 4, the cutting roll passing away over those places without affecting the metal 1, *i. e.* without cutting it.

The stepped cone 6 is screwed upon the threaded end of the spindle 7 of a lathe and secured in its place by a nut 8, and the cutting roll is attached to the opposite part or support of the lathe and pressed against the dished sheet metal plate 1 affixed to the conical support 6, cutting and pre-expanding the metal, as above described.

The sheet metal plates need not be circular, but may be oval if baskets of such cross-section are to be produced the lathe being then, of course, an oval lathe. The steps of the circular or of the oval conical support 6 need not be actual separated steps, but they may be connected with each other so as to form a continuous spiral, whereby the cutting operation is facilitated and may be effected in a continuous way. The body is now adapted to be drawn axially in such a manner that it is expanded in a longitudinal direction and turned into such a basket as represented in Fig. 6.

Having now described my invention, what I desire to secure by Letters Patent of the United States is:

1. The method of manufacturing metal baskets consisting in pressing a suitably cut sheet metal plate into conical shape, producing in the plate thus prepared concentric series of circularly shaped slits forming strips decreasing in length and spaces between the ends of the slits on radial lines, and expanding the plate thus treated in its axial direction for making said slits elliptical and with pointed ends, substantially as described.

2. The method of manufacturing metal baskets consisting in pressing a suitably cut sheet metal plate into conical shape, cutting concentric series of circularly shaped slits into the plate thus prepared, forming strips decreasing in length, and spaces between the ends of the slits on radial lines, and expanding the plate thus treated in its axial direction for transforming said circular slits into elliptical ones having their ends pointed, substantially as described.

3. The method of manufacturing metal baskets consisting in pressing a suitably cut sheet metal plate into conical shape, cutting concentric series of circularly shaped slits into the plate thus prepared forming strips decreasing in length and spaced between the ends of the slits on radial lines, and expanding the slotted metal parts simultaneously for transforming said circular slits into elliptical ones having their ends pointed, substantially as described.

4. The method of manufacturing metal baskets consisting in pressing a suitably cut sheet metal plate into conical shape, and folding at the same time its edge, producing in the metal plate thus prepared concentric series of circularly shaped slits forming strips decreasing in length and spaces between the ends of the slits on radial lines, and expanding the plate thus treated in its axial direction for transforming said circular slits into elliptical ones having their ends pointed, substantially as described.

5. The method of manufacturing metal baskets consisting in pressing a suitably cut sheet metal plate into conical shape, producing in the plate thus prepared concentric series of circularly shaped slits forming strips decreasing in length and spaces between the ends of the slits on radial lines, and expanding the plate thus treated in its axial direction so as to form the slitted metal parts into meshes diminishing in size in the direction from the periphery to the center, substantially as described.

6. The method of manufacturing metal baskets, consisting in producing in a suitably shaped sheet metal plate concentric series of circularly shaped slits, producing between these slits non-slitted metal parts forming strips decreasing in length and spaces between the ends of the slits on radial lines, and expanding the plate thus treated in its axial direction so as to convert it into a basket presenting elliptically shaped slits with substantially pointed ends, substantially as described.

In testimony whereof I affix my signature in presence of two witnesses.

JOHANN RIZZARDI.

Witnesses:
  FRITZ ZERTHY,
  FERNA VOGEL.